Figure 2:
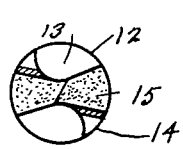

Nov. 8, 1932.     J. V. EMMONS     1,887,372
CUTTING AND FORMING TOOLS, IMPLEMENTS, AND THE LIKE
Filed Dec. 22, 1928     2 Sheets-Sheet 1

INVENTOR.
Joseph V. Emmons
BY
Ray Oberlin & Ray
ATTORNEYS.

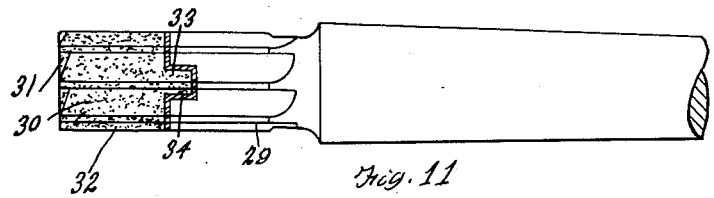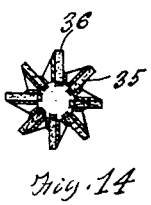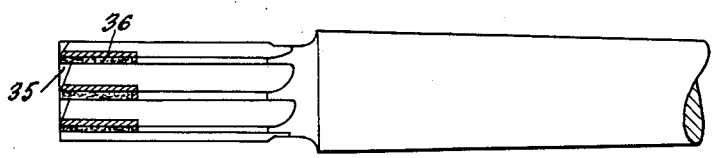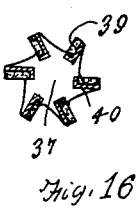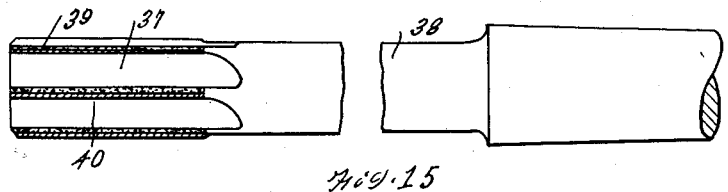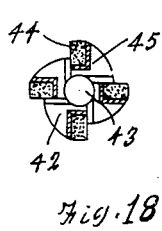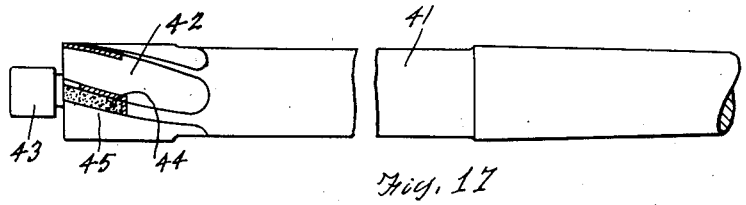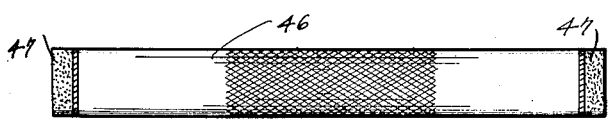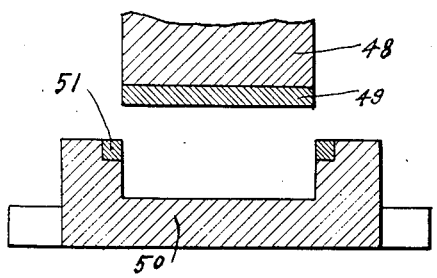

Patented Nov. 8, 1932

1,887,372

UNITED STATES PATENT OFFICE

JOSEPH V. EMMONS, OF SHAKER HEIGHTS, OHIO, ASSIGNOR TO THE CLEVELAND TWIST DRILL COMPANY, OF CLEVELAND, OHIO, A CORPORATION OF OHIO

CUTTING AND FORMING TOOLS, IMPLEMENTS, AND THE LIKE

Application filed December 22, 1928. Serial No. 327,888.

The present invention relates to wearing parts and their manufacture. Its primary object, broadly stated, is to provide a process whereby working or wearing parts formed of the so-called "hard metal alloys" can be united with supporting or positioning parts formed of some other metal such as steel and particularly so-called tool steel or high-speed steel, in order to produce articles which will combine the extreme hardness and wear resisting characteristics of their wearing or working parts with the hardness, tensile strength and heat treating susceptibilities of their supporting or guiding parts.

More specifically, my invention contemplates a process which consists in roughly shaping a body, in roughly shaping wearing parts, in joining such wearing parts to such body, and in then finishing the resulting composite article. It is intended that the body of such article shall be of high-speed, tool, high-carbon, or air hardening steel, or of another metal or alloy having similar wear resisting and tensile properties, and that the wearing parts of such article shall be of one of the class of so-called "hard metal alloys", of which tungsten carbide, and like alloys are examples. The above-mentioned body materials, in any condition, are advantageous because of their hardness and tensile strength, but my invention, with a view to developing either or both of these characteristics preferably provides for a heat treatment of the body of the article being made, such treatment being effected either prior to, simultaneously with, or subsequent to the operation by which the body is joined to its working or wearing parts. This joining operation may be carried out in any approved manner which will result in rigidly securing the individual parts together; and if brazing is selected to this end, the joint should preferably have an appreciable or considerable thickness in order that the interposed metal will be able to absorb the stresses due to the different coefficients of thermal expansion had by the parts being joined.

The process provided by my invention is applicable to the manufacture of cutting tools, drawing dies, gauges, forming instrumentalities, and to the wearing or working parts of mechanical devices and machines; in other words, to the manufacture of all articles which are required to have a supporting or guiding part which is both hard and strong, and a working or wearing part which is extremely hard or resistant to abrasion. It will be appreciated that my invention greatly increases the usefulness of the "hard metal alloys", and that the above-noted body characteristics are obtained without its being necessary to manufacture the entire article from these materials. In cases, it is possible to make a complete article from the alloys alone, but in general this practice is not available because of the costly nature of the material, its lack of strength and toughness, and to manufacturing difficulties which impose limitations as to the size and form of the products. My invention in this field is obviously advantageous.

To the accomplishment of the foregoing and related ends, said invention, then, consists of the means hereinafter fully described and particularly pointed out in the claims; the annexed drawings and the following description setting forth in detail several methods and a number of products exemplifying my invention, such disclosed procedures and products constituting, however, but some of various applications of the principles of my invention.

In said annexed drawings:—

Figure 21:
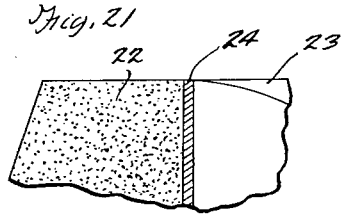

Figs. 1 to 10, inclusive, are side and end elevations of some drills embodying the present improvements; Figs. 11 to 14, inclusive, are side and end elevations of some end mills which likewise embody the present improvements; Figs. 15 and 16 are side and end elevations of a reamer; Figs. 17 and 18 are side and end elevations of a counterbore; Fig. 19 is a side elevational view of a gauge; Fig. 20 is a vertical sectional view of a shearing die and punch assembly; and Fig. 21 is a fragmentary sectional view to an enlarged scale of the tool illustrated in Fig. 7.

Figure 1:
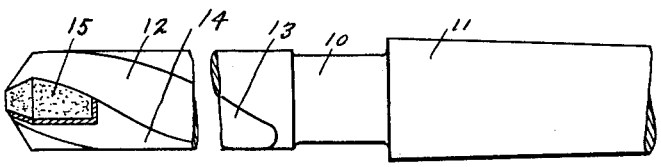
Figure 4:
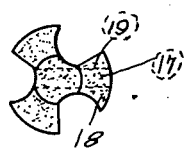
Figure 3:
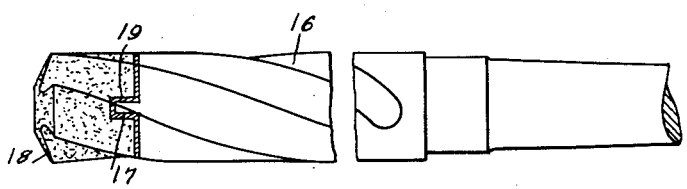
Figure 6:
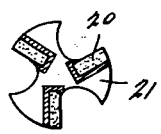
Figure 5:
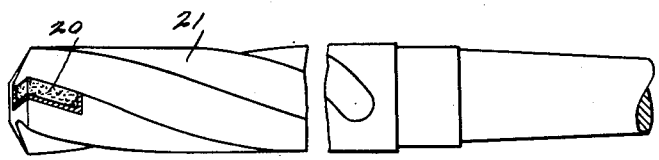
Figure 8:
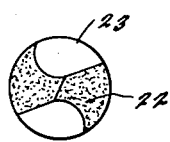
Figure 7:
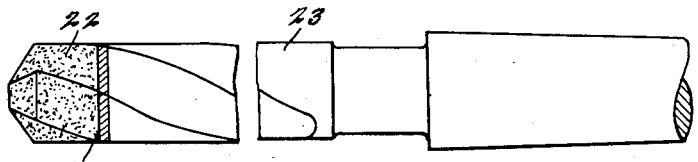
Figure 10:
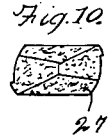
Figure 9:
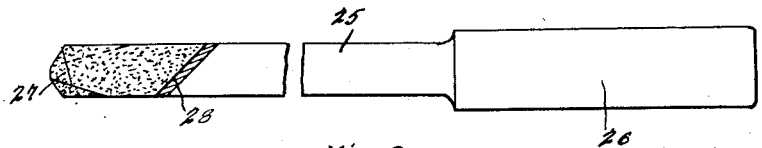

The twist drill shown in Figs. 1 and 2 consists of a body 10 which includes a shank 11 and an operating portion 12. Such operating portion has the usual flutes and lands 13 and 14, and the latter at their ends are provided with the inserted cutters 15. These cutters may be formed on a single piece or they may be formed on separate pieces, but in any case they are preferably so arranged as to effect nearly all of the cutting which the tool flutes or their end portions are adapted to effect when the operating end is constructed in the conventional manner. The drill illustrated in Figs. 3 and 4 has a fluted body 16 which terminates in a tongue 17, and the attached cutting end 18 has a groove 19 which, when engaged with such tongue, is additionally effective to resist the torsional stress to which the tool is subjected in use. The twist drill shown in Figs. 5 and 6 is similar to that illustrated in the next two preceding views, but the cutters 20 are here shown as inserts which are secured to the lands 21, instead of being formed on a tip constituting a longitudinal extension of the body. The tip 22 of the drill shown in Figs. 7 and 8 is a distinct part which is attached to the body 23 by a layer of metal 24 which is most clearly illustrated in Fig. 21. Such tip is formed with the usual cutting edges, and its diameter is preferably about the same as the diameter of the body to which it is secured. The straight or flat drill which is illustrated in Figs. 9 and 10 consists of a body 25, a shank 26, and a cutting tip 27. This tip is provided with cutting edges, and at its plane of juncture with the body a layer of connecting metal 28 is interposed. In order to increase the areas upon which the operating stresses are effective, such plane of juncture between the tip and the body may be inclined in the manner shown.

The end mill illustrated in Figs. 11 and 12 includes a body 29 and a cutting point 30. This cutting point has the end and side edges 31 and 32, and its attaching portion is provided with a tongue 33 which fits within the body groove 34. In most respects, the end mill shown in Figs. 13 and 14 is similar to the end mill just described, but the cutters, instead of being formed on a tip secured in alignment with the body are of the inserted type. Their edges 35 and 36 are adapted for performing the same functions as the corresponding parts of the tool shown in Figs. 11 and 12.

A reamer embodying the present improvements is illustrated in Figs. 15 and 16. The operating portion 37 is here shown as being integral with the body 38, and the cutters 39 are inserted in or attached to the lands 40. If desired, such cutters may be mechanically secured in place and arranged for removal and adjustment. The counterbore shown in Figs. 17 and 18 has a body 41 which is integral with the operating portion 42, and such operating portion is provided with a pilot 43. The cutters 44 are attached to the lands 45 in any suitable manner.

Fig. 19 shows a gauge which consists of the body 46 and the end tips or working parts 47, these latter being secured in place and having their ends ground so that the tool has a specified length. The punch and die shearing assembly illustrated in Fig. 20 includes a punch body 48 which is provided with a working end 49, and a die body 50 which is provided with a working insert 51. Such working or wearing parts effect the actual cutting of the material, and the punch and die bodies constitute supporting or backing members.

The body parts of the tools and other devices above described are formed of alloy steel, high-speed steel, high-carbon steel, tool steel, or of air or self-hardening steel; in other words, of an alloy or other material which is susceptible to heat treatment. The working parts of these articles are formed of a hard metal alloy; those containing considerable quantities of tungsten carbide or molybdenum carbide may be specifically mentioned as examples. Such working parts are preliminarily formed as by casting, by sintering and molding, or by grinding; and the body members are shaped as by casting, forging, tooling or grinding. When the separate elements have been so prepared, they may be secured together in working relation in any approved manner, and the composite article so formed then finished by grinding or lapping if this is necessary. By way of example, a brazing or welding method of securing the separate parts together will be described. The working parts and the body are fitted to each other in the manner above explained; the attaching surfaces are cleaned and temporarily fixed in place; and the article is then heated to a brazing temperature. During such heating, oxidation is prevented by maintaining a neutral or reducing atmosphere in blanketing relation to the work, or by the use of a protective covering of melted borax, or the like. When the article has reached a brazing temperature, the brazing metal may be applied to the joints between the body and the working parts and allowed to fill in the intervening spaces. It is not essential that the parts to be brazed shall have been very accurately fitted to each other; on the contrary, the contiguous surfaces are preferably somewhat rough or uneven, and they may even be slightly spaced from each other in order that the union formed by the liquid brazing metal shall have an appreciable thickness, and in order that such union shall be able to absorb the stresses due to the different coefficients of expansion of the materials being joined. I have found that an alloy consisting of 3% of aluminum and of 97% of copper makes a satisfactory brazing material, and that a joint formed of this material is elastic or ductile enough to obviate any tendency towards breakage or separation of the connected parts.

As examples of the treatment to which the body may be subjected, the following are mentioned: hardening, tempering, carburizing, case hardening, and nitriding. These may be the usual treatments known to workers in the art, and require no detail discussion. Such treatment (for various purposes) may be effected prior to, during, or subsequent to the brazing operation. If the body has been annealed, tempered or hardened prior to the brazing, it is possible that this operation will result in some change in the physical properties of such body while at the brazing temperature, but the desired properties can be again imparted or the original condition restored during the cooling which succeeds the brazing and solidifies the metal of the joint. It is also possible to change or alter the original properties of the body by suitably controlling or regulating the cooling or quenching which follows after the application of the braze. Thus, a body which has been annealed prior to the heating for brazing purposes can be re-annealed during the cooling which follows the brazing operation, or during such cooling such a body can be hardened or tempered, if desired. Similarly, a body which has been tempered or hardened before the heating or brazing purposes can be hardened or re-hardened, tempered or re-tempered, or annealed during the cooling which follows the brazing operation. It is also possible to allow this cooling to proceed without regard to its effect upon the metal of the body, and to subsequently reheat the article in order that its cooling may be controlled and the desired physical properties imparted. Such operations as carburizing are preferably effected prior to the brazing, but if desired this operation can be effected either during the brazing or subsequent to the cooling which follows the brazing. These post-brazing treatments, of course, involve re-heating of the article but it is possible to carry them out without detrimentally affecting the hard metal of the working parts or the bond by which such parts are secured to the body. It will be understood that all heating or other operations effected upon the body are of such a character as to not materially damage the hard metal of the working parts or to change its physical properties. It will also be understood that the heat treatments to which the body is subjected may be intended for developing either the hardness or the tensile or the torsional strength of the metal, as in some cases one of these properties may be preferable to the other. If the heat treatment of the body subsequent to the cooling which follows the brazing is of such a nature as to tend to detrimentally affect the working parts, such parts may be protected during this treatment so that their properties will remain unimpaired. Obviously, the composition and properties of the metal used in the bond between the separate parts can be varied in any manner made necessary by the character of the parts, or by the nature of the treatment to which the body is to be subjected. Finally, it may be stated that my invention contemplates the use of other than welding and brazing processes for securing the parts together; in some cases mechanical securing means will be quite satisfactory.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. As an article of manufacture, a composite metallic structure having a rigid supporting part of hardened steel, and a wearing part of hard non-ferrous metallic composition, said parts having materially different coefficients of thermal expansion, and a layer of ductile material between adjacent surfaces of said parts and united thereto and bonding the same together against rupture during relative movement resulting from differences in thermal expansion and contraction.

2. As an article of manufacture, a composite metallic structure having a rigid supporting part of hardened steel, and a wearing part of hard non-ferrous metallic composition, said parts having materially different coefficients of thermal expansion, and a layer of ductile material of greater thickness than that required for brazing between adjacent surfaces of said parts bonding the same together against rupture during relative movement resulting from differences in thermal expansion and contraction.

3. As an article of manufacture, a composite metallic structure comprising a wearing part of hard and brittle non-ferrous metallic composition, and a rigid supporting part of hardened steel having a materially greater tensile strength and toughness, said parts having materially different coefficients of thermal expansion, and a layer of ductile material between adjacent surfaces of said parts bonding the same together against rupture during relative movement resulting from the differences in thermal expansion and contraction.

4. As an article of manufacture, a tool having a rigid part of hardened tool steel and a part of hard non-ferrous metallic composition, the coefficients of thermal expansion of which are materially different, and a layer of ductile material between adjacent surfaces of said parts bonding the same together against rupture during relative movement resulting from the differences in thermal expansion and contraction.

5. As an article of manufacture, a tool having a rigid part of hardened tool steel and a part of hard non-ferrous metallic composition, the coefficients of thermal expansion of which are materially different, and a layer of ductile material of a greater thickness than that required for brazing between adjacent surfaces of said parts bonding the same together against rupture during relative movement resulting from the differences in thermal expansion and contraction.

6. As an article of manufacture, a tool having a wearing part of hard and brittle non-ferrous metallic composition, and a rigid supporting part therefor of hardened tool steel having a greater tensile strength and toughness, said parts having materially different coefficients of thermal expansion, and a layer of ductile material between adjacent surfaces of said parts bonding the same together against rupture during relative movement resulting from the differences in thermal expansion and contraction.

7. As an article of manufacture, a tool having a rigid supporting part of nitrided steel and a part of hard non-ferrous metallic composition, the coefficients of thermal expansion of which are materially different, and a layer of ductile material between adjacent surfaces of said parts having its surface atomically united to said parts and bonding the same together against rupture during relative movement resulting from the differences in thermal expansion and contraction.

8. As an article of manufacture, a rotary cutting tool or the like having a part of hardened tool steel and a part of hard non-ferrous material, the coefficients of thermal expansion of which are materially different, and means for bonding said parts together against rupture during relative movement resulting from the differences in thermal expansion and contraction.

9. As an article of manufacture, a rotary cutting tool or the like having a part of hardened tool steel and a part of hard non-ferrous material, the coefficients of thermal expansion of which are materially different, and a layer of ductile material therebetween having its surfaces atomically united to said parts for bonding the same together against rupture during relative movement resulting from the differences in thermal expansion and contraction.

10. As an article of manufacture, a rotary cutting tool or the like having a part of hardened tool steel and a part of hard non-ferrous material, the coefficients of thermal expansion of which are materially different, and a layer of ductile material of a greater thickness than that required for brazing or bonding said parts together against rupture during relative movement resulting from the differences in thermal expansion and contraction.

11. As an article of manufacture, a rotary cutting tool or the like having a wearing part of hard and brittle non-ferrous material and a supporting member therefor of hardened tool steel having greater tensile strength and toughness, said parts having materially different coefficients of thermal expansion, and means for uniting said parts against rupture during relative movement resulting from the differences in thermal expansion and contraction.

Signed by me this 20th day of December, 1928.

JOSEPH V. EMMONS.